US009500908B2

(12) United States Patent
Chen et al.

(10) Patent No.: US 9,500,908 B2
(45) Date of Patent: Nov. 22, 2016

(54) DISPLAY PANEL AND DISPLAY DEVICE

(71) Applicant: INNOLUX CORPORATION, Jhu-Nan, Miao-Li County (TW)

(72) Inventors: Cheng-Hsiung Chen, Jhu-Nan (TW); Yu-Lin Yeh, Jhu-Nan (TW); An-Chang Wang, Jhu-Nan (TW); Yi-Ching Chen, Jhu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 217 days.

(21) Appl. No.: 14/516,518

(22) Filed: Oct. 16, 2014

(65) Prior Publication Data

US 2015/0138491 A1 May 21, 2015

(30) Foreign Application Priority Data

Nov. 15, 2013 (TW) .............................. 102141633 A

(51) Int. Cl.
*G02F 1/1337* (2006.01)
*G02F 1/1343* (2006.01)
*G02F 1/1335* (2006.01)

(52) U.S. Cl.
CPC ... *G02F 1/133723* (2013.01); *G02F 1/133608* (2013.01); *G02F 1/133711* (2013.01); *G02F 1/134309* (2013.01); *G02F 2001/133715* (2013.01); *G02F 2001/133776* (2013.01)

(58) Field of Classification Search
CPC ........... G02F 1/1337; G02F 1/134309; G02F 1/133707; G02F 1/1362; G02F 1/139; G02F 2001/133776

USPC .......................................... 349/123, 139–141
See application file for complete search history.

(56) References Cited

U.S. PATENT DOCUMENTS

| 6,876,416 | B2* | 4/2005 | Yun | .................... | G02F 1/136227 349/123 |
| 7,760,277 | B2* | 7/2010 | Lai | .................... | G02F 1/136209 349/110 |
| 2011/0175836 | A1* | 7/2011 | Sakai | .................. | G02F 1/13338 345/173 |
| 2015/0185516 | A1* | 7/2015 | Lee | ........................ | G02F 1/1339 349/110 |

FOREIGN PATENT DOCUMENTS

TW 200937075 9/2009

* cited by examiner

*Primary Examiner* — Huyen Ngo
(74) *Attorney, Agent, or Firm* — Liu & Liu

(57) ABSTRACT

A display panel comprises a first substrate, a second substrate and a liquid crystal layer. The first substrate includes a first transparent conductive layer and a first alignment layer. The first transparent conductive layer includes a first surface and has at least a first notch, the first alignment layer includes a first part and a second part, the first part is disposed in the first notch, the second part is disposed on the first surface, and the surface roughness of the first part of the first alignment layer is greater than that of the second part. The second substrate is disposed opposite to the first substrate. The liquid crystal layer is disposed between the first substrate and the second substrate. A display device having the display panel is also disclosed.

12 Claims, 4 Drawing Sheets

DISPLAY PANEL AND DISPLAY DEVICE

CROSS REFERENCE TO RELATED APPLICATIONS

This Non-provisional application claims priority under 35 U.S.C. §119(a) on Patent Application No(s). 102141633 filed in Taiwan, Republic of China on Nov. 15, 2013, the entire contents of which are hereby incorporated by reference.

BACKGROUND

1. Technical Field

The invention relates to a display panel and a display device and, in particular, to a display panel and a display device formed by the polymer sustained alignment (PSA) technology.

2. Related Art

With the progress of technologies, display devices have been widely applied to various kinds of fields. Especially, liquid crystal display (LCD) devices, having advantages such as compact structure, low power consumption, less weight and less radiation, gradually take the place of cathode ray tube (CRT) display devices, and are widely applied to various electronic products, such as mobile phones, portable multimedia devices, notebooks, LCD TVs and LCD screens.

In the multi-domain vertical alignment (MVA) technology for enhancing the thin film transistor (TFT) liquid crystal display (LCD), the PSA (polymer sustained alignment) is a maturely developed technique to increase the aperture ratio and contrast. In the PSA technology, a photosensitive monomer is added into the LC layer and/or the alignment layer and then illuminated by the ultraviolet under the application of an electric field, and therefore the photosensitive monomer is polymerized to become a polymer on the alignment layer. Besides, the polymer arranges according to the pattern of a patterned transparent conductive layer of the TFT substrate or CF substrate, and therefore the multi-domain alignment of the LC can be achieved by the polymer.

In the conventional PSA technology, a patterned notch is formed on the transparent conductive layer of the TFT substrate or the CF substrate. When the pixel electrode of the display panel is driven to generate an electric field, the LC can rotate along the pre-tilted direction through the notch and the alignment layer formed on the transparent conductive layer. Therefore, the response of the LC can be accelerated, and besides, the multi-domain alignment of the display panel can be achieved.

However, when the pixel electrode of the display panel is driven to generate the electric field, the electric-field intensity of the notch is weaker than other regions having the transparent conductive layer, because the transparent conductive layer is not disposed in the notch. Accordingly, the LC molecules in the notch will be affected by the surrounding electric field and the rotation thereof thus becomes uncontrollable. Therefore, the unstable rotation of the LC molecules will affect the response time of the LC molecules and also result in the problem of image retention.

Therefore, it is an important subject to provide a display panel and a display device where the unstable rotation situation of the LC molecules is diminished so that the response ability of the LC in the notch can be maintained and the image retention can be avoided.

SUMMARY

In view of the foregoing subject, an objective of the invention is to provide a display panel and a display device where the unstable rotation situation of the LC molecules is diminished so that the response ability of the LC in the notch can be maintained and the image retention can be avoided.

To achieve the above objective, a display panel according to the invention comprises a first substrate, a second substrate and a liquid crystal layer. The first substrate includes a first transparent conductive layer and a first alignment layer. The first transparent conductive layer includes a first surface and has at least a first notch, the first alignment layer includes a first part and a second part, the first part is disposed in the first notch, the second part is disposed on the first surface, and the surface roughness of the first part of the first alignment layer is greater than that of the second part. The second substrate is disposed opposite to the first substrate. The liquid crystal layer is disposed between the first substrate and the second substrate.

To achieve the above objective, a display device according to the invention comprises a display panel including a first substrate, a second substrate and a liquid crystal layer. The first substrate includes a first transparent conductive layer and a first alignment layer. The first transparent conductive layer includes a first surface and has at least a first notch, the first alignment layer includes a first part and a second part, the first part is disposed in the first notch, the second part is disposed on the first surface, and the surface roughness of the first part of the first alignment layer is greater than that of the second part. The second substrate is disposed opposite to the first substrate. The liquid crystal layer is disposed between the first substrate and the second substrate.

In one embodiment, the maximum peak-to-valley roughness of the first part is greater than that of the second part.

In one embodiment, the first part includes a plurality of first protrusions, the second part includes a plurality of second protrusions, and the maximum height of the first protrusions is greater than that of the second protrusions.

In one embodiment, the maximum width of the section of the first notch is greater than or equal to 5 nm, and is less than or equal to 30 nm.

In one embodiment, the second substrate includes a second transparent conductive layer, the second transparent conductive layer includes a plurality of transparent conductive portions disposed apart, and each of the transparent conductive portions is disposed corresponding to at least one of the first notches.

In one embodiment, a second notch is formed between the two adjacent transparent conducive portions, the second transparent conductive layer further includes a second surface facing the first surface, the second substrate further includes a second alignment layer, the second alignment layer includes a third part and a fourth part, the third part is disposed in the second notches, the fourth part is disposed on the second surface, and the surface roughness of the third part of the second alignment layer is greater than that of the fourth part.

As mentioned above, in the display panel and the display device of the invention, when the display panel is driven to generate an electric field, the LC molecules can rotate along the pre-tilted direction by the polymer on the first and second alignment layers so that the response ability of the LC can be enhanced and the multi-domain alignment can be achieved. Besides, the first part of the first alignment layer is disposed in the first notch of the first transparent conductive layer, the second part is disposed on the first surface of the first transparent conductive layer, and the surface roughness of the first part is greater than that of the second part. Thereby, the LC molecules disposed corresponding to the first part can be stabilized by the rougher or larger protrusions of the first part, so as not to be affected by the surrounding electric field. Therefore, the response ability of the LC corresponding to the notch region can be maintained and the problem of image retention can be avoided in the display panel and the display device of the invention.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION

The present invention will be apparent from the following detailed description, which proceeds with reference to the accompanying drawings, wherein the same references relate to the same elements.

The display panel of the invention can be an in-plane switch (IPS) LCD panel, a fringe field switching (FFS) LCD panel, a vertical alignment mode (VA mode) LCD panel, a photo alignment mode (PA mode) LCD panel, or a 3D LCD panel, but the invention is not limited thereto.

Figure 1A:
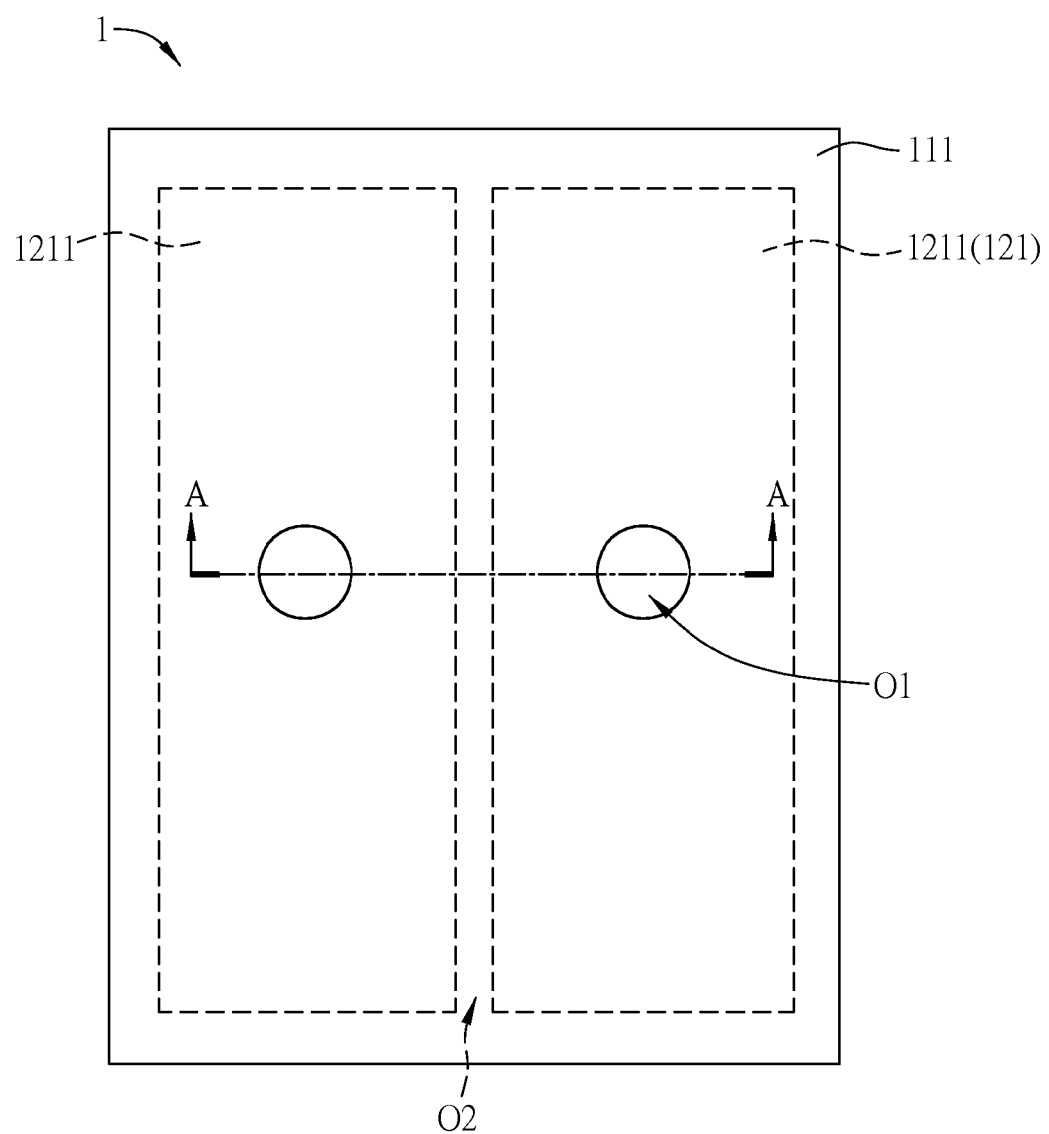
FIG. 1A is a schematic top view of a display panel according to a embodiment of the invention.
Figure 1B:
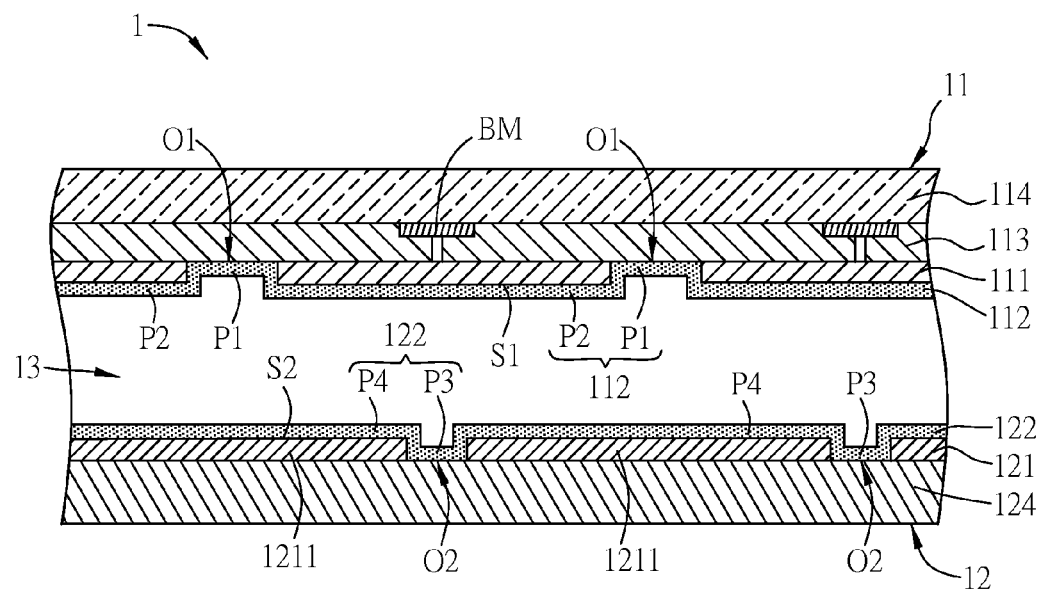
FIG. 1B is a schematic sectional diagram of the display panel 1 taken along the line A-A in FIG. 1.

FIG. 1A is a schematic top view of a display panel 1 according to a preferred embodiment of the invention, and FIG. 1B is a schematic sectional diagram of the display panel 1 taken along the line A-A in FIG. 1. For clearly showing the relationship between the elements of the display panel 1, FIG. 1A just shows the first transparent conductive layer 111 and the first notch O1 of the first substrate 11, and the two adjacent transparent conductive portions 1211 of the second transparent conductive layer 121 of the second substrate 12, and only shows two first notches O1 and two transparent conductive portions 1211.

The display panel 1 includes a first substrate 11, a second substrate 12 and a liquid crystal layer 13. The first substrate 11 and the second substrate are disposed oppositely, and the liquid crystal layer is disposed between the first and second substrates 11 and 12. The first and second substrates 11 and 12 are made by a transparent material, and each of them can be a glass substrate, a quartz substrate or a plastic substrate for example. In this embodiment, the first substrate 11 is a color filter (CF) substrate and the second substrate 12 is a thin film transistor (TFT) substrate for example. In other embodiments, the black matrix layer of the CF substrate can be removed to the TFT substrate, so that the first substrate 11 becomes a BOA (BM on array) substrate. Otherwise, the CF layer can be removed to the TFT substrate, so that the first substrate 11 becomes a COA (color filter on array) substrate. However, the invention is not limited thereto.

The first substrate 11 includes a first transparent conductive layer 111 and a first alignment layer 112, and the first alignment layer 112 is disposed on the first transparent conductive layer 111. Besides, the first substrate 11 further includes a color filter layer 113 and a black matrix layer BM. The color filter layer 111, the first transparent conductive layer 111 and the first alignment layer 112 are sequentially disposed on a transparent substrate 114, and the black matrix layer BM is also disposed on the transparent substrate 114. The color filter layer 113 includes a plurality of color filter portions, and a segment of the black matrix layer BM is disposed between the two adjacent color filter portions. The black matrix layer BM is made by an opaque material, such as metal or resin, and the said metal can be chromium, chromium oxide or chromium oxynitride. The black matrix layer BM made by opaque material can form opaque regions so as to define the transparent regions. When the light passes through the transparent regions of the first substrate 11, colors can be shown by the color filter portions of the first substrate 11.

The first transparent conductive layer 111 includes a first surface S1 and has at least a first notch O1, and the first surface S1 faces the second substrate 12. Herein, the first transparent conductive layer 111 has a plurality of the first notches O1 for example. The maximum width of the section of the first notch O1 can be greater than or equal to 5 μm, and be less than or equal to 30 μm. The section of the first notch O1 has, for example, a circular shape, a polygonal shape or an irregular shape, and has a circular shape with the diameter of 15 μm as an embodiment. The material of the first transparent conductive layer 111 includes, for example, indium-tin oxide (ITO), indium-zinc oxide (IZO), aluminum-zinc oxide (AZO), GZO, or zinc oxide (ZnO), but the invention is not limited thereto. The first alignment layer 112 includes a first part P1 and a second part P2. The first part P1 is disposed in the first notch O1, and the second part P2 is disposed on the first surface S1. In other words, the second part P2 of the first alignment layer 112 is formed on the surface (the first surface S1) of the first transparent conductive layer 111 facing the second substrate 12, and the first part P1 of the first alignment layer 112 is formed in the first notches O1. The material of the first alignment layer 112 includes, for example but is not limited to, polyimide (PI).

Figure 2A:
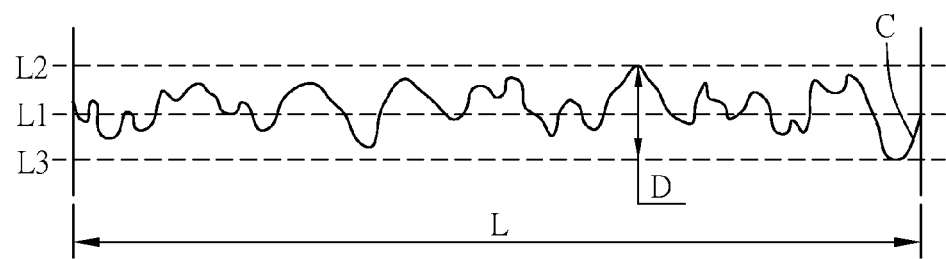
FIG. 2A is a schematic diagram showing the roughness of maximum peak-to-valley.
Figure 2B:
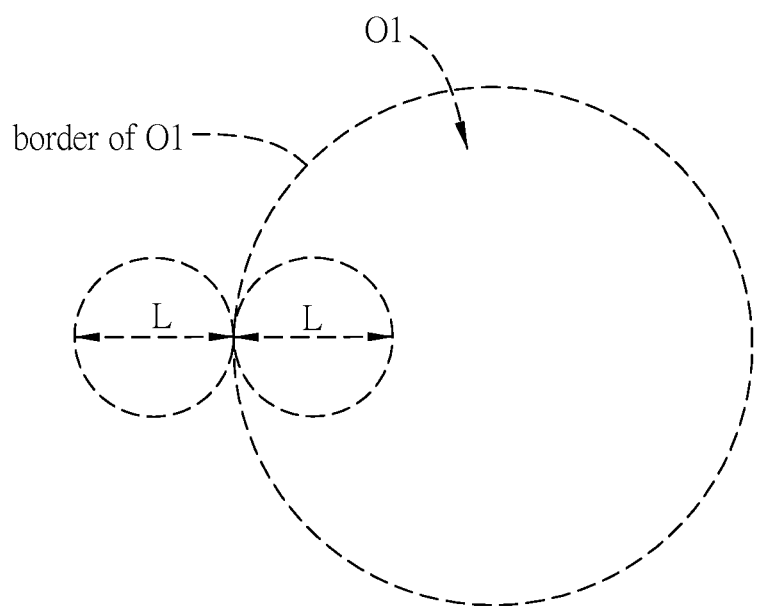
FIG. 2B is a schematic diagram of the basal lengths on the two sides of the border of the first notch.

The surface roughness of the first part P1 of the first alignment layer 112 is greater than that of the second part P2. Generally, the surface roughness has three representations, the first is arithmetical mean deviation, the second is maximum peak-to-valley, and the third is ten point height of irregulaties. By taking the maximum peak-to-valley as an example, as shown in FIG. 2A, a length of the profile C is defined as a basal length L, two lines L2 and L3 parallel to the mean line L1 of the profile C are plotted passing through the highest and lowest points of the profile C, respectively, within the basal length L, and the perpendicular distance D between the two lines L2, L3 is the maximum peak-to-valley. In other words, the distance between the highest and lowest points within the basal length L and along the direction perpendicular to the direction of the basal length L are measured as the maximum peak-to-valley. Accordingly, as an embodiment shown in FIG. 2B, the maximum peak-to-valley roughness on the two sides (i.e. the first part P1 and the second part P2) of the border of the first notch O1 within the length L (as the basal length) are compared with each other. The minimum of the length L can be 1 μm and the maximum of the length L can be the sectional width (e.g. 15 μm) of the first notch O1, for example. Physically, the maximum peak-to-valley roughness of the first part P1 of the first alignment layer 112 is greater than that of the second part P2, or the arithmetical mean deviation of the first part P1 of the first alignment layer 112 is greater than that of the second part P2, or the ten point height of irregularities of the first part P1 of the first alignment layer 112 is greater than that of the second part P2. However, the invention is not limited to the above-mentioned roughness types.

Figure 2C:
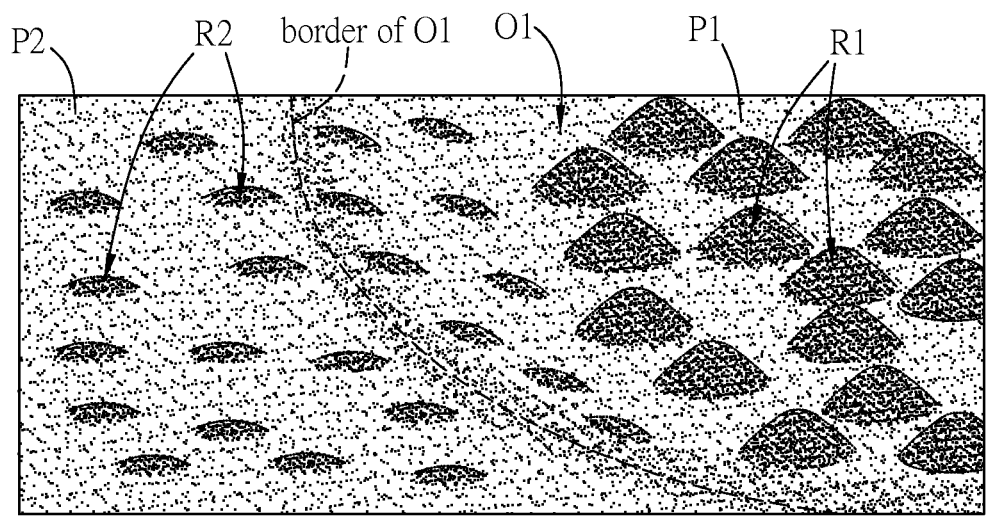
FIG. 2C is a schematic SEM micrograph of the partial first part and the partial second part of the first alignment layer of an embodiment of the invention.

FIG. 2C is a schematic SEM micrograph of the partial first part P1 and the partial second part P2 of the first alignment layer 112 of an embodiment of the invention.

As shown in FIG. 2C, in this embodiment, the first part P1 includes a plurality of first protrusions R1, and the second part P2 includes a plurality of second protrusions R2. The surface roughness of the first part P1 is greater than that of the second part P2, and the maximum height of the first protrusions R1 is also greater than that of the second protrusions R2. Physically, as shown in FIG. 2C, the first part P1 includes the rougher and larger (higher) protrusion than the second part P2, and besides, the mean height of the first protrusions R1 of the first part P1 is greater than that of the second protrusions R2 of the second part P2. In this embodiment, only the protrusion within a specified region (for example, a circular region having the diameter with the minimum of 1 µm and the maximum of the sectional width of the first notch O1) having the height greater than 0.05 µm and less than 2 µm is counted in the calculation of the above-mentioned mean height. For the counted protrusions, the maximum height of the first protrusions R1 of the first part P1 is greater than that of the second protrusions R2 of the second part P2, and the mean height of the first protrusions R1 of the first part P1 is also greater than that of the second protrusions R2 of the second part P2.

As shown in FIGS. 1A and 1B, the second substrate 12 includes a second transparent conductive layer 121. The second transparent conductive layer 121 includes a plurality of transparent conductive portions disposed apart, and the transparent conductive portions are disposed on the surface of a transparent substrate 124 facing the first substrate 11. The transparent conductive portions 1211 are disposed in a two-dimensional array, and each of them is a pixel electrode of a sub-pixel of the display panel 1. Besides, each of the transparent conductive portions 1211 is disposed corresponding to at least one of the first notches O1. In this embodiment, each of the transparent conductive portions 1211 is disposed corresponding to a single first notch O1. In other embodiments, each of the transparent conductive portions 1211 may be disposed corresponding to a plurality of the first notches O1. A second notch O2 is formed between the two adjacent transparent conducive portions 1211.

The second substrate 12 further includes a second alignment layer 122 disposed on the second transparent conducive layer 121, and the second transparent conductive layer 121 further includes a second surface S2 facing the first surface 51. The second alignment layer 122 includes a third part P3 and a fourth part P4. The third part P3 is disposed in the second notches O2, and the fourth part P4 is disposed on the second surface S2. The surface roughness of the third part P3 of the second alignment layer 122 is greater than that of the fourth part P4. The third part P3 includes a plurality of third protrusions and the fourth part P4 includes a plurality of fourth protrusions. The maximum height of the third protrusions is greater than that of the fourth protrusions. The surface roughness can be comprehended by referring to the foregoing description, and therefore is not described here for conciseness.

Moreover, the display panel 1 can further include a photosensitive monomer material (not shown), which can be mixed in the liquid crystal layer 13, in the first alignment layer 112 and the second alignment layer 122, or in the liquid crystal layer 13, the first alignment layer 112 and the second alignment layer 122. When the PSA technology is applied to the display panel 1, the photosensitive monomer material can be polymerized by the photomask, the intensity control of the electric field and the time and intensity control of the ultraviolet illumination to the first part P1 and the second part P2, to become the polymer on the first part P1 and the second part P2 of the first alignment layer 112, and the polymer includes the protrusions with different roughness and mean height so that the surface roughness of the first part P1 can be greater than that of the second part P2.

Figure 3:
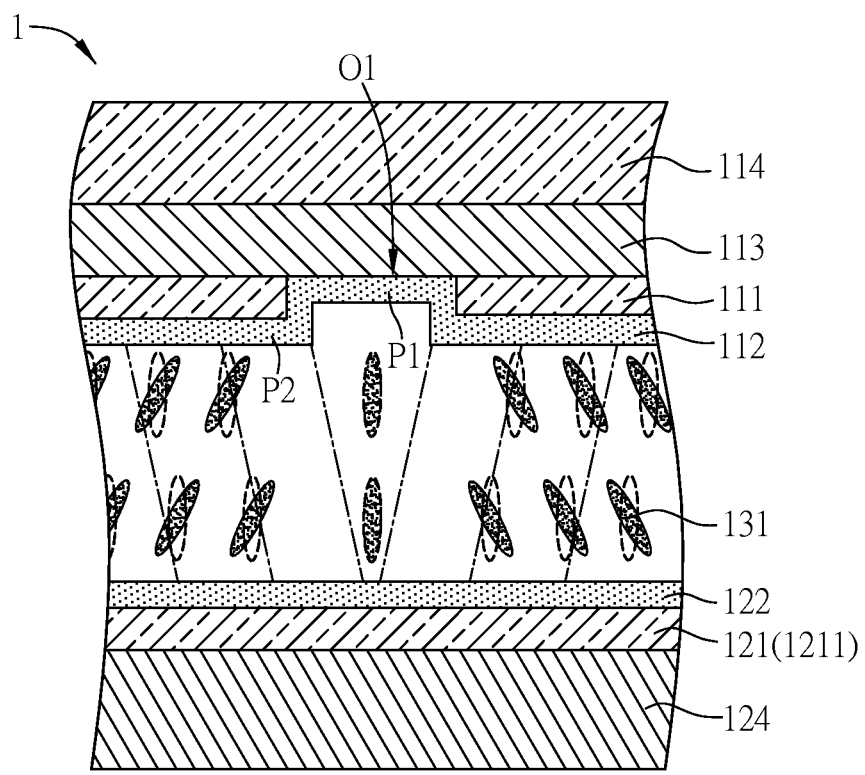
FIG. 3 is a schematic sectional diagram of the partial display panel in FIG. 1B.

FIG. 3 is a schematic sectional diagram of the partial display panel 1 in FIG. 1B.

In this embodiment, as shown in FIG. 3, when the display panel 1 is driven to generate an electric field, the LC molecules 131 of the LC layer 13 can rotate along the pre-tilted direction by the polymer on the first and second alignment layers 112 and 122 so that the response ability of the LC can be enhanced and the multi-domain alignment of the display panel 1 can be achieved. Besides, because the surface roughness of the first part P1 of the first alignment layer 112 is greater than that of the second part P2, the LC molecules 131 disposed corresponding to the first part P1 can be stabilized by the rougher or larger protrusions (i.e. polymer) of the first part P1, so as not to be affected by the surrounding electric field of the first notch O1 (the rougher and larger polymer protrusions can effectively stabilize the corresponding LC molecules so that the LC molecules can not rotate disorderly). Therefore, the response ability of the LC corresponding to the notch region can be maintained and the problem of image retention can be avoided in the display panel 1.

Figure 4:
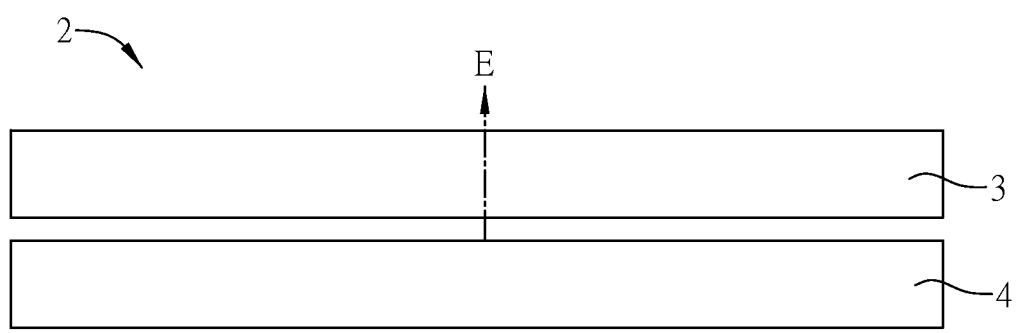
FIG. 4 is a schematic diagram of a display device according to a embodiment of the invention.

FIG. 4 is a schematic diagram of a display device 2 according to a preferred embodiment of the invention.

As shown in FIG. 4, the display device 2 includes a display panel 3 and a backlight module 4, which are disposed opposite to each other. The display panel 3 includes the above-mentioned display panel 1, and therefore is not described here for conciseness. When the backlight module 4 emits the light passing through the display panel 3, the pixels of the display panel 3 can show colors to form images.

In summary, in the display panel and the display device of the invention, when the display panel is driven to generate an electric field, the LC molecules can rotate along the pre-tilted direction by the polymer on the first and second alignment layers so that the response ability of the LC can be enhanced and the multi-domain alignment can be achieved. Besides, the first part of the first alignment layer is disposed in the first notch of the first transparent conductive layer, the second part is disposed on the first surface of the first transparent conductive layer, and the surface roughness of the first part is greater than that of the second part. Thereby, the LC molecules disposed corresponding to the first part can be stabilized by the rougher or larger protrusions of the first part, so as not to be affected by the surrounding electric field. Therefore, the response ability of the LC corresponding to the notch region can be maintained and the problem of image retention can be avoided in the display panel and the display device of the invention.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display panel, comprising:
   a first substrate including a first transparent conductive layer and a first alignment layer, wherein the first transparent conductive layer includes a first surface and has at least a first notch, the first alignment layer includes a first part and a second part, the first part is disposed in the first notch, the second part is disposed on the first surface, and the surface roughness of the first part of the first alignment layer is greater than that of the second part;
   a second substrate disposed opposite to the first substrate; and
   a liquid crystal layer disposed between the first substrate and the second substrate.

2. The display panel as recited in claim 1, wherein the maximum peak-to-valley roughness of the first part is greater than that of the second part.

3. The display panel as recited in claim 1, wherein the first part includes a plurality of first protrusions, the second part includes a plurality of second protrusions, and the maximum height of the first protrusions is greater than that of the second protrusions.

4. The display panel as recited in claim 1, wherein the maximum width of the section of the first notch is greater than or equal to 5 µm, and is less than or equal to 30 µm.

5. The display panel as recited in claim 1, wherein the second substrate includes a second transparent conductive layer, the second transparent conductive layer includes a plurality of transparent conductive portions disposed apart, and each of the transparent conductive portions is disposed corresponding to at least one of the first notches.

6. The display panel as recited in claim 5, wherein a second notch is formed between the two adjacent transparent conducive portions, the second transparent conductive layer further includes a second surface facing the first surface, the second substrate further includes a second alignment layer, the second alignment layer includes a third part and a fourth part, the third part is disposed in the second notches, the fourth part is disposed on the second surface, and the surface roughness of the third part of the second alignment layer is greater than that of the fourth part.

7. A display device, comprising:
   a display panel including a first substrate, a second substrate and a liquid crystal layer, wherein the first substrate includes a first transparent conductive layer and a first alignment layer, the first transparent conductive layer includes a first surface and has at least a first notch, the first alignment layer includes a first part and a second part, the first part is disposed in the first notch, the second part is disposed on the first surface, the surface roughness of the first part of the first alignment layer is greater than that of the second part, the second substrate is disposed opposite to the first substrate, and the liquid crystal layer is disposed between the first substrate and the second substrate.

8. The display device as recited in claim 7, wherein the maximum peak-to-valley roughness of the first part is greater than that of the second part.

9. The display device as recited in claim 7, wherein the first part includes a plurality of first protrusions, the second part includes a plurality of second protrusions, and the maximum height of the first protrusions is greater than that of the second protrusions.

10. The display device as recited in claim 7, wherein the maximum width of the section of the first notch is greater than or equal to 5 nm, and is less than or equal to 30 nm.

11. The display device as recited in claim 7, wherein the second substrate includes a second transparent conductive layer, the second transparent conductive layer includes a plurality of transparent conductive portions disposed apart, and each of the transparent conductive portions is disposed corresponding to at least one of the first notches.

12. The display device as recited in claim 11, wherein a second notch is formed between the two adjacent transparent conducive portions, the second transparent conductive layer further includes a second surface facing the first surface, the second substrate further includes a second alignment layer, the second alignment layer includes a third part and a fourth part, the third part is disposed in the second notches, the fourth part is disposed on the second surface, and the surface roughness of the third part of the second alignment layer is greater than that of the fourth part.

* * * * *